(12) United States Patent
Buse et al.

(10) Patent No.: US 9,091,365 B2
(45) Date of Patent: Jul. 28, 2015

(54) ELECTROMAGNETIC PRESSURE-REGULATING VALVE FOR CONTROLLING PRESSURE-CONTROLLED COMPONENTS IN MOTOR VEHICLES

(75) Inventors: Werner Buse, Kaarst (DE); Alvito Fernandes, Leverkusen (DE); Max Hermann, Neuss (DE); Roman Morawietz, Kaarst (DE)

(73) Assignee: PIERBURG GMBH, Neuss (DE)

( * ) Notice: Subject to any disclaimer, the term of this patent is extended or adjusted under 35 U.S.C. 154(b) by 63 days.

(21) Appl. No.: 14/236,330

(22) PCT Filed: Jul. 2, 2012

(86) PCT No.: PCT/EP2012/062804
§ 371 (c)(1),
(2), (4) Date: Jan. 31, 2014

(87) PCT Pub. No.: WO2013/017352
PCT Pub. Date: Feb. 7, 2013

(65) Prior Publication Data
US 2014/0166916 A1 Jun. 19, 2014

(30) Foreign Application Priority Data

Aug. 3, 2011 (DE) .......................... 10 2011 109 207

(51) Int. Cl.
*F16K 11/04* (2006.01)
*F02B 37/12* (2006.01)
*F16K 31/06* (2006.01)
(Continued)

(52) U.S. Cl.
CPC ........... *F16K 31/0658* (2013.01); *F02B 37/186* (2013.01); *F16K 1/34* (2013.01); *F16K 31/0672* (2013.01); *Y02T 10/144* (2013.01)

(58) Field of Classification Search
CPC ............. F16K 31/0658; F16K 31/0672; F02B 37/183; F02B 37/186; F02B 37/12; Y10T 137/264; Y10T 137/86879; Y10T 137/8772
USPC ........... 137/115.25, 625.48, 840; 251/129.05, 251/129.17
See application file for complete search history.

(56) References Cited

U.S. PATENT DOCUMENTS 4,461,149 A * 7/1984 Suzuki ............................ 60/602
4,483,146 A * 11/1984 Morikawa ....................... 60/602
(Continued)

FOREIGN PATENT DOCUMENTS

DE    40 39 324 A1    6/1992
DE    41 10 003 C1    7/1992
(Continued)

*Primary Examiner* — John Fox
(74) *Attorney, Agent, or Firm* — Norman B. Thot

(57) ABSTRACT

An electromagnetic pressure-regulating valve includes a housing comprising a first, a second and a third port, a valve seat, a valve closure member, an electromagnetic drive, and a biasing device. The electromagnetic drive comprises a coil wound on a coil carrier, an armature, a core, and an electromagnetic return-path device. The armature moves between a first and second end position and acts on the valve closure member. The biasing device is configured so that, when a current does not flow, the armature, and thereby the valve closure member, is positioned in a fail-safe setting on the valve seat so that a connection from the third port to each of the first and second ports is closed. The valve seat is connected via a fluid channel to the first and second ports. The armature is steplessly adjustable between the first and second end positions in every setting.

10 Claims, 1 Drawing Sheet

(51) Int. Cl.
  *F02B 37/18*   (2006.01)
  *F16K 1/34*   (2006.01)

(56) References Cited

U.S. PATENT DOCUMENTS

| | | | |
|---|---|---|---|
| 4,790,139 A * | 12/1988 | Roach | 60/602 |
| 4,832,313 A | 5/1989 | Hashimoto et al. | |
| 4,893,646 A * | 1/1990 | Wimmer | 137/487.5 |
| 5,271,228 A * | 12/1993 | Kawakami | 60/602 |
| 5,427,352 A | 6/1995 | Brehm | |
| 5,755,101 A * | 5/1998 | Free et al. | 60/602 |
| 6,606,981 B2 * | 8/2003 | Itoyama | 123/568.21 |
| 8,191,455 B2 * | 6/2012 | Baeuerle et al. | 91/275 |
| 2006/0145545 A1 | 7/2006 | Reichert et al. | |
| 2009/0294712 A1 | 12/2009 | Hutchings et al. | |

FOREIGN PATENT DOCUMENTS

| | | |
|---|---|---|
| DE | 43 32 117 A1 | 3/1995 |
| DE | 43 34 032 A1 | 4/1995 |
| FR | 2 890 431 A1 | 3/2007 |
| WO | WO 2004/044932 A1 | 5/2004 |

* cited by examiner

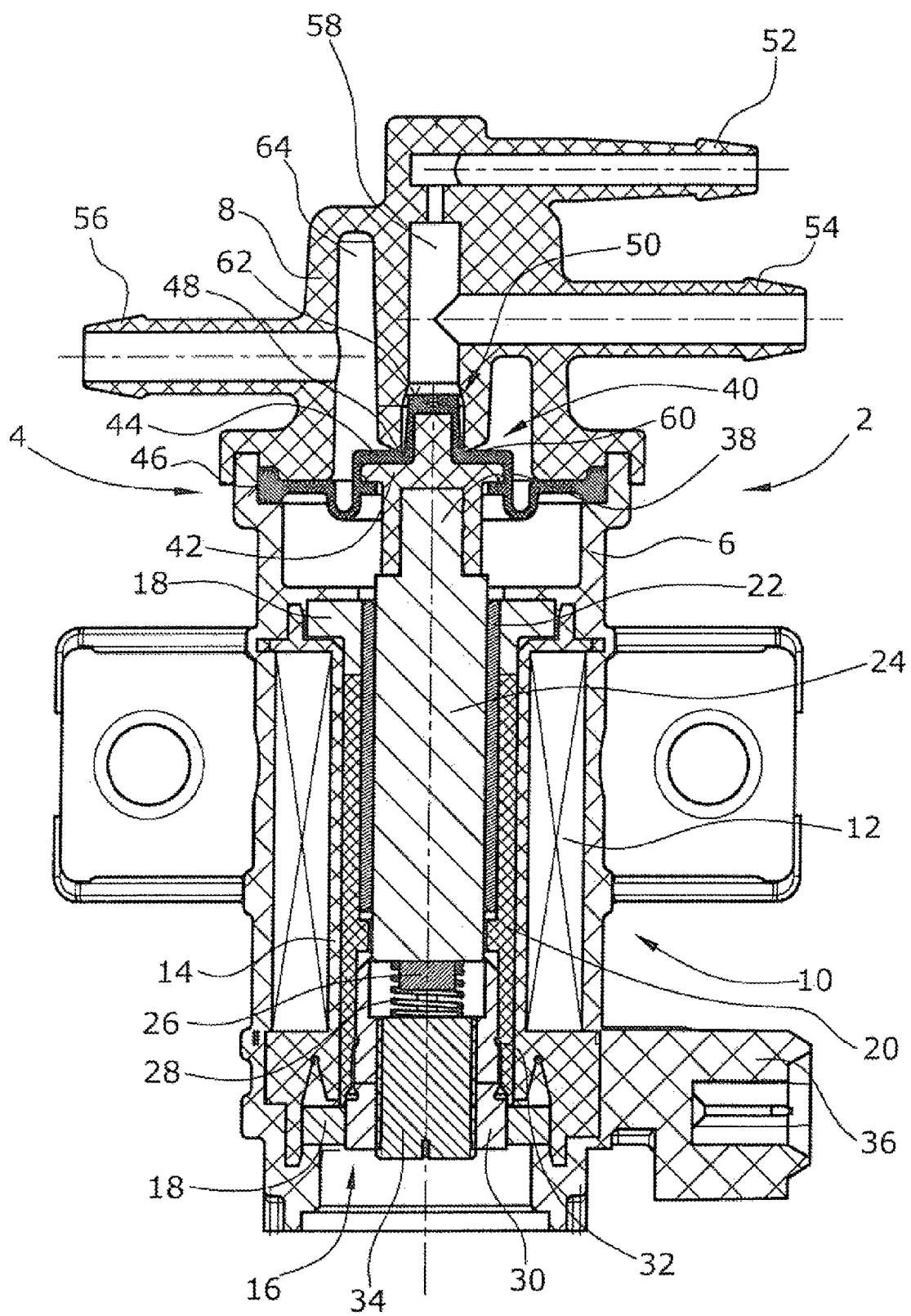

ELECTROMAGNETIC PRESSURE-REGULATING VALVE FOR CONTROLLING PRESSURE-CONTROLLED COMPONENTS IN MOTOR VEHICLES

CROSS REFERENCE TO PRIOR APPLICATIONS

This application is a U.S. National Phase application under 35 U.S.C. §371 of International Application No. PCT/EP2012/062804, filed on Jul. 2, 2012 and which claims benefit to German Patent Application No. 10 2011 109 207.6, filed on Aug. 3, 2011. The International Application was published in German on Feb. 7, 2013 as WO 2013/017352 A1 under PCT Article 21(2).

FIELD

The present invention relates to an electromagnetic pressure-regulating valve for controlling pressure-controlled components in motor vehicles, with a housing which has a first port connected to a pressure source, a second port connected to the pressure-controlled component, and a third port connected to a fixed pressure level, for example, atmospheric pressure, at least one valve seat, and also an electromagnetic drive, wherein the electromagnetic drive is composed of a coil wound on a coil carrier, an armature, a core, and an electromagnetic return-path device, wherein the armature is mounted so as to be movable between two end positions and acts at least indirectly on a valve closure member, wherein pre-tensioning means are provided which, when no current is flowing, position the armature, and therefore the valve closure member, in a fail-safe setting on the valve seat in such a way that a connection from the third port to the first and second ports is closed, wherein the first and second ports are connected fluidically to each other.

BACKGROUND

Such pressure-regulating valves have previously been described. These pressure-regulating valves are particularly needed for the flexible control of a wastegate. It is known that internal combustion engines and turbochargers are not ideal partners. The air flow of the intake air is proportional to an increase in rotational speed. In turbochargers, the relation is entirely different. The air flow here does not increase proportionally, but quadratic with respect to the rotational speed of the turbocharger. To prevent an excessive boost pressure from damaging or destroying the engine at high rotational speeds, a bypass is provided in the turbine housing, which is called a wastegate. The wastegate basically has two end positions: closed and open. In the closed position of the wastegate, the combination of the engine and the turbocharger shows the same behavior as the system without the wastegate. In the interest of protecting the engine from destruction due to an excessive boost pressure at excessive rotational speeds, the wastegate is opened so that the turbocharger can be bypassed and the boost pressure can be lowered. However, since, in particular with gasoline engines, different load conditions require different boost pressures in the characteristic map ranges of the engine in order to ensure optimum combustion, a flexible control of the wastegate is required for various rotational speeds. There is therefore a large operation range of the wastegate between the two end positions mentioned depending on the rotational speed and the engine power. For example, a rotatable flap may be arranged in the wastegate which has to be controlled. Since the installation space in the area of the turbocharger is very hot, pneumatic drives with low temperature sensitivity are in particular used. An actuator of the flap situated in the wastegate is correspondingly configured as a pressure-controlled pressure actuator. A spring arranged in the pressure actuator maintains the flap in the closed position when in a non-energized state.

A pressure-control is required for a variable control of the actuator which, when an excessive boost pressure prevails, opens the flap in the wastegate against the bias force of the spring arranged in the actuator. Such pressure-regulating valves are often configured as electromagnetic pressure-regulating valves having a first port at which the boost pressure of the turbocharger prevails, a second port connected with the pressure-controlled component, for example, the pressure actuator, and a third port often connected to the atmosphere and therefore being at atmospheric pressure. Due to the set of characteristic curves of the internal combustion engine stored in the engine control, a boost pressure is defined for each load condition and range of rotational speed, which, based on the current boost pressure, exists at the second port as a mixed pressure composed of the boost pressure and atmospheric pressure. The level of this mixed pressure at the second port can in particular be influenced by the switching frequency and the modulation of the electromagnetic drive. Switching frequencies of up to 35 Hz are currently common with known pressure-regulating valves. In this case, 35 so-called time slots exist in one second, wherein, depending on the pulse width modulation used, a time slot can be kept open or closed for different lengths of time. With a duty cycle of 100%, a time slot is caused to assume the open position over the entire period so that the current boost pressure of the turbocharger prevails at the second port.

A higher switching frequency of about 300 Hz is desired to allow for an even more precise boost pressure regulation in the interest of optimizing the combustion process and of thereby lowering the fuel consumption and the emission values. Although such a switching frequency could be achieved with the electromagnetic drives used, the known pressure-regulating valves are, in particular, not designed therefore, these valves having two valve seats, i.e., a first valve seat for interrupting the connection between the third port and the first and second ports, and a second valve seat for interrupting the connection between the boost pressure port and the second and third port. Such a high frequency would have too negative an influence on the oscillation behavior of these known pressure-regulating valves and would compromise the service life of the valve.

SUMMARY

An aspect of the present invention is to provide a pressure-regulating valve that can provide a high switching frequency of, for example, 300 Hz in a simple and economic manner.

In an embodiment, the present invention provides an electromagnetic pressure-regulating valve for controlling a pressure-controlled component in a motor vehicle which includes a housing comprising a first port connected to a pressure source, a second port connected to the pressure-controlled component, and a third port connected to a fixed pressure level, at least one valve seat, a valve closure member, an electromagnetic drive, and a biasing device. The electromagnetic drive comprises a coil wound on a coil carrier, an armature, a core, and an electromagnetic return-path device. The armature is mounted so as to be movable between a first end position and a second end position and to act at least indirectly on the valve closure member. The biasing device is configured so that, when a current does not flow, that the armature, and thereby the valve closure member, is positioned in a fail-safe setting on the at least one valve seat so that a connection from the third port to each of the first port and to the second port is closed, the first port and the second port being in a fluidic connection with each other. The at least one valve seat is arranged so that the at least one valve seat is connected via a fluid channel to the first port and to the second port so that the first port and the second port are in a fluidic connection with each other in every operating state. The armature is configured to be steplessly adjustable between the first end position and the second end position in every setting.

BRIEF DESCRIPTION OF THE DRAWINGS

The present invention is described in greater detail below on the basis of embodiments and of the drawing in which:

FIG. 1 shows a pressure-regulating valve of the present invention in section.

DETAILED DESCRIPTION

In an embodiment of the present invention, one valve seat is configured so that it is connected with the first and the second port via a fluid cannel so that the first and the second port are in fluid communication in any operational state, wherein the armature can be controlled so that it is continuously adjustable in any position between the two end positions. A significantly higher switching frequency of the valve closure member can thereby be achieved since only one interruption, namely the interruption between the third port and the two other ports (first and second ports), must be switched.

In an embodiment of the present invention, the valve closure member can, for example, have a first axial surface for abutment on the valve seat and a second axial surface arranged in the fluid channel spaced from the first axial surface, wherein the second axial surface has a smaller diameter than the first axial surface. This measure prevents a sudden high fluid mass flow when the pressure-regulating valve is opened; this has such a positive effect on the oscillation behavior of the pressure-regulating valve that no additional intricate damping measures must be taken which would negatively affect the dynamics of the pressure-regulating valve. This effect is increased further if a portion of the fluid channel flares in the direction of the valve seat such that the valve seat has a flow-through area $A_1$ larger than the flow-through area $A_2$ of the fluid channel at the beginning of the portion.

In an embodiment of the present invention, the housing can, for example, be provided substantially as a two-part design with a drive housing part and a cover part having the first, second and third ports, wherein a membrane is arranged between the two housing parts which forms the valve closure member with the first and second axial surfaces. This membrane may act, for example, as a dirt membrane for protecting the electromagnetic drive from damage by dirt particles. It is further conceivable that the membrane per se has a certain spring force that can be used at least partly as a biasing means for the armature.

In an embodiment of the present invention, the biasing means can, for example, comprise a spring supported at the core. A means for adjusting the spring force can here be provided.

In order to implement the modulation method as exactly as possible, means for adjusting the magnetic force can be provided, wherein the means for adjusting the magnetic force comprise an adjusting screw arranged in the core by means of a thread or a knurling. Under aspects of assembly technology, it is particularly feasible if the means for adjusting the spring force are also formed by the adjusting screw.

An embodiment of the present invention will be described hereinafter with reference to the drawing.

FIG. 1 illustrates a pressure-regulating valve 2 of the present invention in section. In the shown embodiment, the pressure-regulating valve 2 comprises a two-part housing 4 with a drive housing part 6 and a cover part 8. The drive housing part 6 comprises an electromagnetic drive 10. The electromagnetic drive 10 comprises a coil 12 wound on a coil carrier 14. Further, at the end of the electromagnetic drive 10 averted from the cover part 8, a core 16 is mounted in a return-path device 18. The return-path device 18 is of a known multi-part design, with the present illustration only showing the return path plates at 18. In a known centering sleeve 20, which can, for example, be made of a plastic, a bearing bush 22 is provided for a movable armature 24. In the shown embodiment, the armature 24 comprises a protrusion member 26 on which a spring 28 is arranged that is supported on the core 16 and exerts a biasing force on the armature 24, as will be described later. In the shown embodiment, the protrusion member 26 is made from a non-magnetizable material, such as VA steel, and at the same time serves as an abutment face for the armature 24 on the core 16. In the shown embodiment, the core 16 substantially is an annular outer member 30 arranged in the return path plate 18 and mounted in the centering sleeve 20 by means of snap-in locking devices 32. The core 16 further comprises an adjusting screw 34 by which the magnetic force can be adjusted very precisely during final assembly. In the shown embodiment, the biasing force of the spring 28 can also be adjusted by means of the adjusting screw 34. An embodiment can also be conceived in which a further adjusting element is provided for adjusting the spring force of the spring 28 independent from the magnetic force. The electromagnetic drive 10 is connected with an engine control (not illustrated in detail) via a connector 36.

At the portion of the armature 24 facing to the cover part 8, the armature 24 comprises a second protrusion member 38 on which a valve closure member 40 is fixed. In the shown embodiment, the valve closure member 40 is of a two-part design and is composed of a base part 42 on which a membrane 44 is arranged that has its circumferential surface 46 clamped between the cover part 8 and the drive housing part 6. In this manner, the drive housing part 6 is securely protected against dirt. At the same time, the membrane 44, together with the base part 42 forms a flexible valve closure member 40 that fluid-tightly abuts against the valve seat 48 with a first axial surface 60.

In addition to the valve seat 48, the cover part has a region 50 and a first port 52 at which the boost pressure of a turbocharger (not illustrated in detail) prevails, a second port 54 connected with a pressure actuator (not illustrated in detail) which operates a flap in a wastegate, and a third port 56 connected to the atmosphere. The first port 52 and the second port 54 are in communication via a fluid channel 58 at the end of which the valve seat 48 is arranged. A second axial surface 62 of the valve closure member 40, which has a smaller diameter than the first axial surface 60, extends into the fluid channel 58. In the region 50, the fluid channel 58 further flares towards the valve seat 48 so that the valve seat 48 has a flow-through area $A_1$ that is larger than the flow-through area $A_2$ of the fluid channel 58 at the beginning of the region 50. In this manner, the flow through the fluid channel 58 towards the third port 56 is influenced such that the damping behavior of the pressure-regulating valve 2 is significantly improved. In particular when the valve 2 is opened, the fluid mass flow is thus increased slowly and not abruptly.

In the non-energized state, the biasing force of the spring 28 acting on the armature 24 presses the two axial surfaces 60 and 62 of the valve body 40 against the valve seat 48, whereby the fluid channel 58 is closed and, consequently, only a fluid communication between the first port 52 and the second port 54 exists. In the open state, the fluid channel 58 is connected with a chamber 64 which in turn is in fluid communication with the third port 56.

In the shown embodiment, the pressure-regulating valve 2 of the present invention may be clocked with a switching frequency of 300 Hz, allowing for a precise regulation. During one cycle, the armature 24 with the valve closure member 40 is lifted from the valve seat 48 in correspondence with the pulse width selected, so that the fluid channel 58 is in fluid communication with the third port 56 via the chamber 64, so that the air flow present at the first port 52 can flow out via the third port 56, so that a lower pressure prevails at the second port 54. It should be clear that this pressure-regulating valve 2 of the present invention allows for a very precise pressure regulation at the second port 54 in dependence on the boost pressure prevailing at the first port 52. The wastegate can thus be opened or closed in a manner tuned most exactly to the respective characteristic map ranges in order to supply suitable boost pressure to the internal combustion engine on an optimal manner.

The present invention is not limited to embodiments described herein; reference should be had to the appended claims.

What is claimed is:

1. An electromagnetic pressure-regulating valve for controlling a pressure-controlled component in a motor vehicle, the electromagnetic pressure-regulating device comprising:
   a housing comprising a first port connected to a pressure source, a second port connected to the pressure-controlled component, and a third port connected to a fixed pressure level;
   at least one valve seat;
   a valve closure member;
   an electromagnetic drive comprising a coil wound on a coil carrier, an armature, a core, and an electromagnetic return-path device, the armature being mounted so as to be movable between a first end position and a second end position and to act at least indirectly on the valve closure member; and
   a biasing device configured so that, when a current does not flow, that the armature, and thereby the valve closure member, is positioned in a fail-safe setting on the at least one valve seat so that a connection from the third port to each of the first port and to the second port is closed, the first port and the second port being in a fluidic connection with each other,
   wherein,
   the at least one valve seat is arranged so that the at least one valve seat is connected via a fluid channel to the first port and to the second port so that the first port and the second port are in a fluidic connection with each other in every operating state, and
   the armature is configured to be steplessly adjustable between the first end position and the second end position in every setting.

2. The electromagnetic pressure-regulating valve as recited in claim 1, wherein the fixed pressure level is atmospheric pressure.

3. The electromagnetic pressure-regulating valve as recited in claim 1, wherein the valve closure member comprises a first axial surface which is configured to abut on the at least one valve seat, and a second axial surface which is arranged in the fluid channel at a distance from the first axial surface, wherein the first axial surface comprises a diameter, and the second axial surface comprises a diameter, and the diameter of the second axial surface being smaller than the diameter of the first axial surface.

4. The electromagnetic pressure-regulating valve as recited in claim 3, wherein the valve closure member further comprises a membrane which is configured to form the first axial surface and the second axial surface, the housing comprises a drive housing part and a cover part comprising the first port, the second port, and the third port, and the membrane is arranged between the drive housing part and the cover part.

5. The electromagnetic pressure-regulating valve as recited in claim 1, wherein the fluid channel comprises a region which is configured to flare in a direction of the valve seat so that the valve seat comprises a flow-through area $A_1$ at an end of the region which is larger than a flow-through area $A_2$ of the fluid channel at a beginning of the region.

6. The electromagnetic pressure-regulating valve as recited in claim 1, wherein the biasing device comprises a spring configured to be supported at the core.

7. The electromagnetic pressure-regulating valve as recited in claim 6, further comprising a spring force adjusting device configured to adjust a spring force.

8. The electromagnetic pressure-regulating valve of as recited in claim 1, further comprising a magnetic force adjusting device configured to adjust a magnetic force.

9. The electromagnetic pressure-regulating valve as recited in claim 8, wherein the magnetic force adjusting device comprises an adjusting screw arranged in the core via a thread or a knurling.

10. The electromagnetic pressure-regulating valve as recited in claim 9, further comprising a spring force adjusting device configured to adjust a spring force, wherein the spring force adjusting device is formed by the adjusting screw.

* * * * *